March 26, 1968

R. J. SLEEPER 3,374,698

MACHINE FOR DISPENSING FLEXIBLE ELONGATED
MATERIAL SUCH AS CORD AND THE LIKE

Filed Oct. 24, 1965

INVENTOR
RICHARD J. SLEEPER

BY *Roy A. Plant*

ATTORNEY

March 26, 1968 R. J. SLEEPER 3,374,698
MACHINE FOR DISPENSING FLEXIBLE ELONGATED
MATERIAL SUCH AS CORD AND THE LIKE
Filed Oct. 24, 1965 4 Sheets-Sheet 2

INVENTOR
RICHARD J. SLEEPER
BY Roy A. Plant
ATTORNEY

March 26, 1968  R. J. SLEEPER  3,374,698
MACHINE FOR DISPENSING FLEXIBLE ELONGATED
MATERIAL SUCH AS CORD AND THE LIKE
Filed Oct. 24, 1965  4 Sheets-Sheet 3
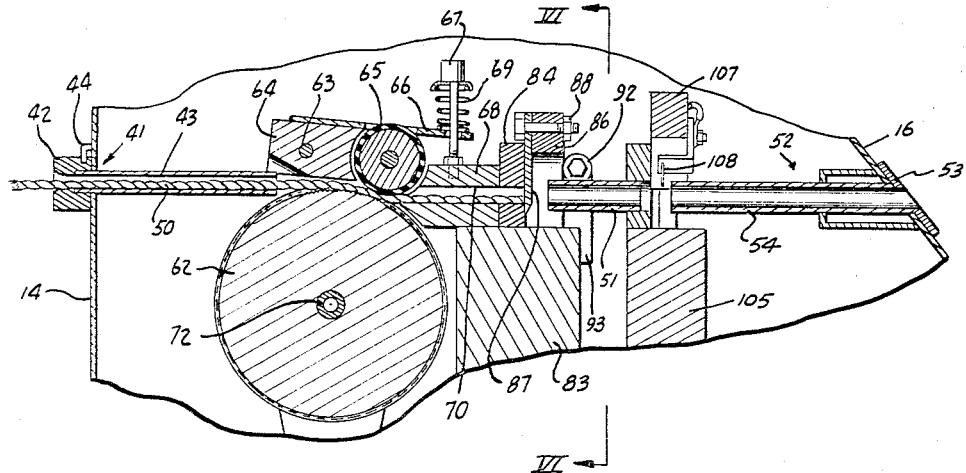
FIG. 5
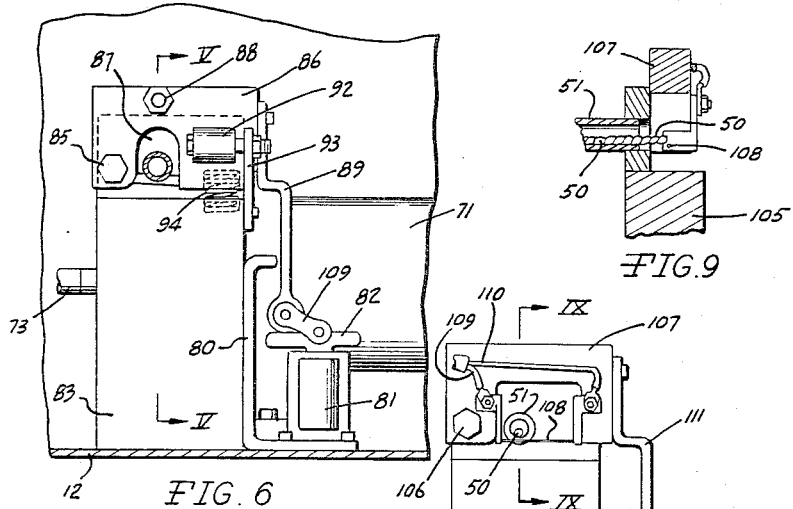
FIG. 6
FIG. 9
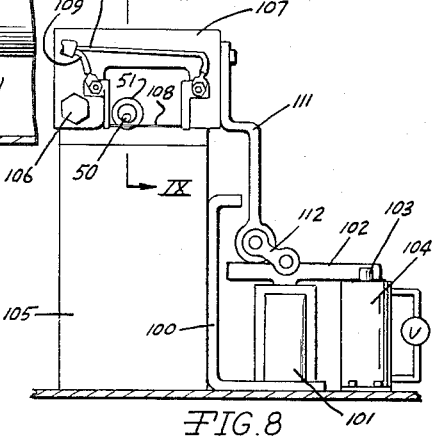
FIG. 8
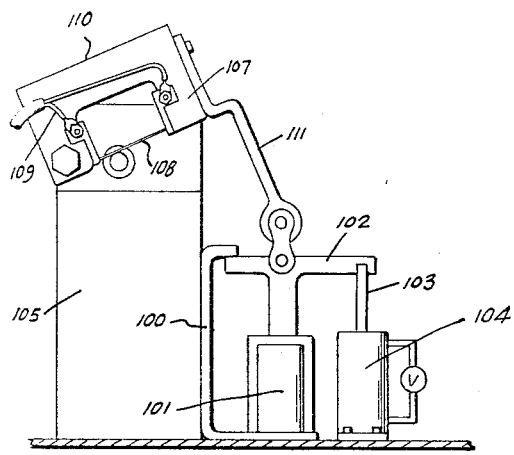
FIG. 7
INVENTOR
RICHARD J. SLEEPER
BY Roy A. Plant
ATTORNEY

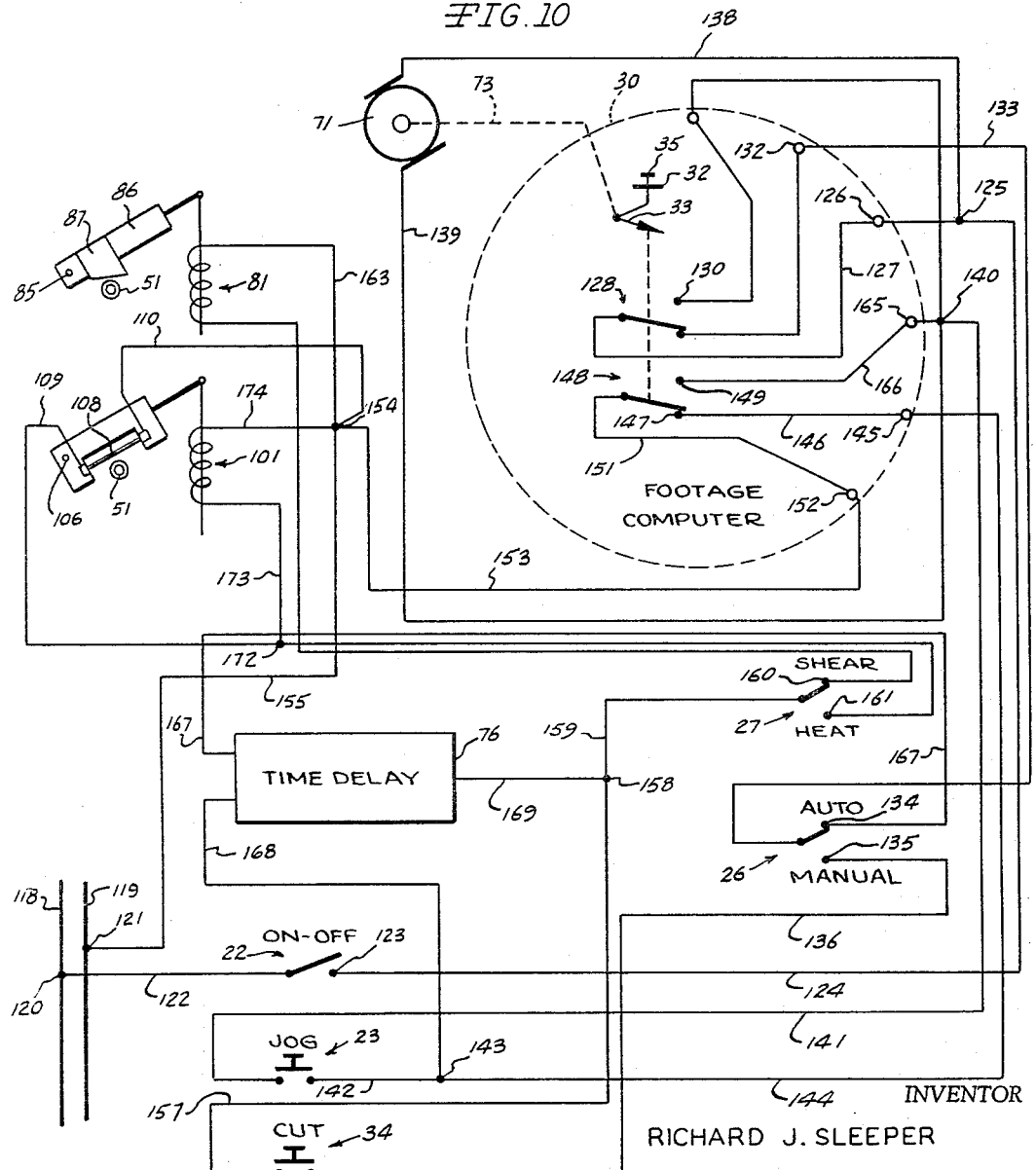

United States Patent Office 3,374,698
Patented Mar. 26, 1968

3,374,698
MACHINE FOR DISPENSING FLEXIBLE ELONGATED MATERIAL SUCH AS CORD AND THE LIKE
Richard J. Sleeper, 1307 W. Chicago Road, Sturgis, Mich. 49091
Filed Oct. 24, 1965, Ser. No. 504,478
18 Claims. (Cl. 83—171)

ABSTRACT OF THE DISCLOSURE

This invention resides in a line dispensing machine which is self-contained and provides portable characteristics. The mechanism has a drive mechanism which causes the movement of the line to pass through the machine. The drive mechanism is adjacent a cutting mechanism both of which are controlled by a timer unit. The drive mechanism is controlled so that it will stop after a required length of line has been dispensed. The cutter mechanism is controlled so that it is not actuated until the drive mechanism has brought the line to a complete stop. The line member is guided into and guided out of the dispensing mechanism by inlet and outlet tubes which surround the line member to control its passage. The mechanism contains controls to make dispensing manual or automatic and includes a jog switch to assist in initially loading the line member.

---

The present invention relates broadly to an elongated material dispensing machine, and in its specific phases to a flexible line measuring and cutting device having automatic and manual controls.

Until the present invention was conceived, most cutting operations for cord, rope, string, wire, cable, et cetera, were accomplished in various unscientific and low productivity manners such as having one individual walk a measured distance with a length of line to be cut and then cut the material, or when a shorter piece was wanted it would be measured individually and cut, still another method would be to wrap strands of material around two posts cutting them for their desired length. Many other means could be enumerated.

With the advent of the increased work in the electronics industry, many wire lengths are required to be cut on almost a random basis. Many of these are not the type of products which are initially started on a production line basis. Therefore, there has developed a need in this industry for equipment which can assist and supplement assemblers in their many manual tasks of manufacture on making new short run pieces of equipment and prototypes. The small internal combustion engine field has increased over the last few years with short strands of line being utilized to start these engines. Automatic methods to help facilitate the cutting of the short lines have not been available. Another example of dispensing large footage of line is in the boating industry. A person may need thirteen feet of line, but is often required to purchase a pre-cut line of a greater length and cut it to his desired size. Frequently, there are applications such as the parachute industry where many strands of line of uniform length are used on the same product. Because there has not been available for use a unit which would have application both by manufacturers and by wholesale and retail outlets, the consuming public has been greatly hampered from receiving a desirable treatment in acquiring necessary line lengths in the amount needed and in the volume required. It was a recognition of these difficulties and shortcomings which led to the conception and development of the present invention. Accordingly, among the objects of the present invention is the provision of a line dispensing machine which is a self-contained unit and can dispense a predetermined length of line.

Another object of the present invention is to provide a novel line dispensing machine which is provided with a cutting apparatus which permits the line to come to rest before the cutting commences.

A further object of the present invention is to provide a flexible elongated material dispensing machine which prevents the line from entering the machine in a knotted or irregular condition.

A further object of the present invention is to provide a line dispensing and cutting machine having a shear cutting unit.

A further object of the present invention is to provide a line dispensing and cutting machine having a heat cutting unit.

A further object of the present invention is to provide a line dispensing and cutting machine provided with a selecting feature for selecting either a shear cutting unit or a heat cutting unit.

A further object of the present invention is to provide a line dispensing and cutting machine provided with controls to automatically dispense a predetermined length of line and to provide a jogging switch to assist in loading the line in the machine before commencing operation.

A further object of the present invention is to provide an automatic line dispensing and cutting machine with the means of switching the unit to a manual cut-off operation when desirable.

Still further objects and advantages of the present invention will appear as the description proceeds.

To the accomplishment of the foregoing and related ends, the invention, then, consists of a flexible line dispensing and cutting machine hereinafter fully described and particularly pointed out in the claims, the annexed drawings and the following description setting forth in detail certain means for carrying out the invention, such disclosed means illustrating, however, but several of various ways in which the principle of the invention may be used.

In the annexed drawings:

FIGURE 5 is a partial sectional view of the line dispensing and cutting machine taken along line V—V of FIGURE 6 just after the shear cut assembly unit has cut a length of line and looking in the direction of the arrows.

FIGURE 6 is an end elevational view of the shear cut assembly unit in its retracted position taken along line VI—VI of FIGURE 5 and looking in the direction of the arrows.

FIGURE 7 is an end elevational view showing the heat cut unit in its extended position taken along line VII—VII of FIGURE 2, and looking in the direction of the arrows.

FIGURE 8 is an end elevational view of the heat cut assembly unit shown in FIGURE 7 in its retracted position.

FIGURE 9 is a partial sectional view taken along line

IX—IX of FIGURE 8, showing the heat cutter block in its retracted position.

FIGURE 10 is a schematic electrical layout illustrating a typical wiring diagram to accomplish the functions of a line dispensing and cutting machine illustrated in FIGURES 1 through 9.

Figure 1:
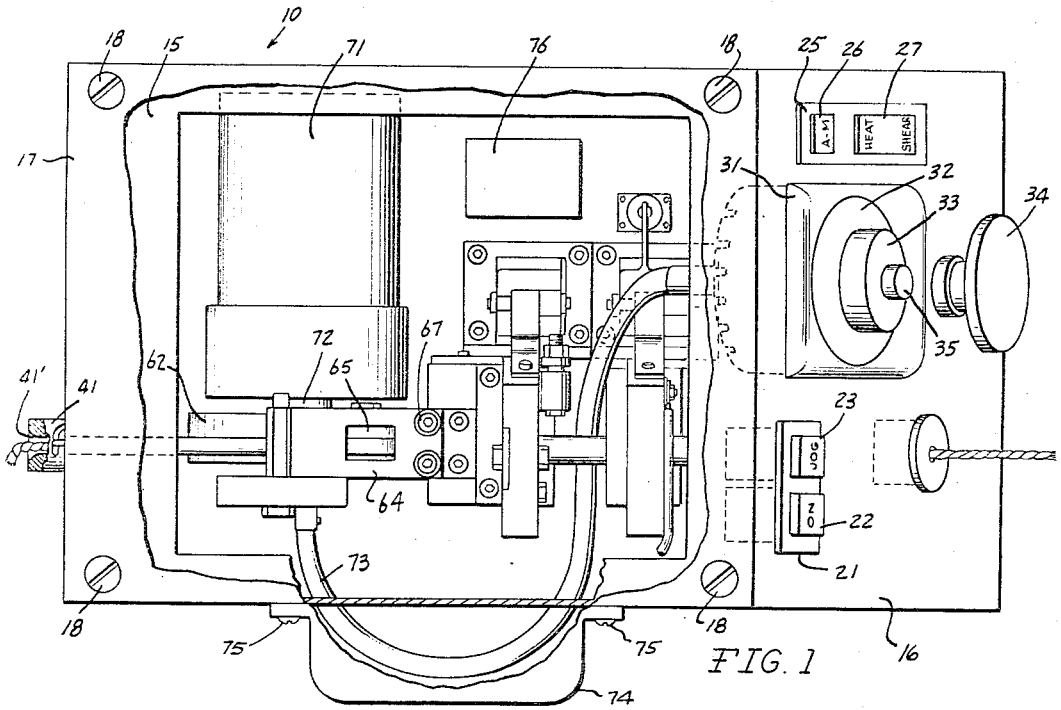
FIGURE 1 is a top plan view particularly in cut away section showing a line dispensing and cutting machine illustrating the physical construction of the present invention.
Figure 2:
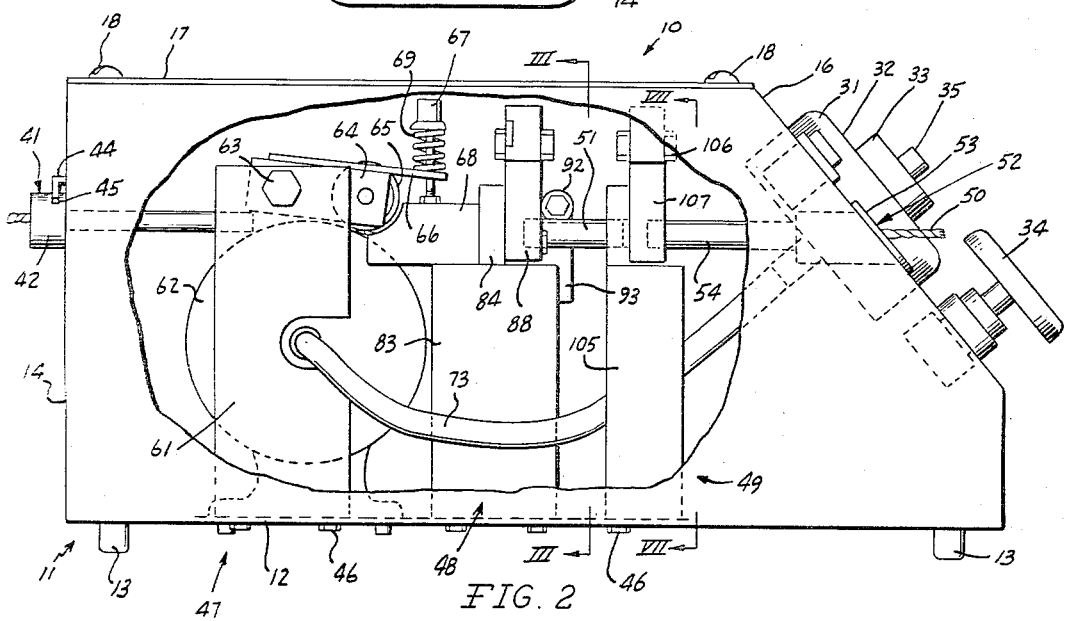
FIGURE 2 is a side elevational view, partly in cut away section, showing the line dispensing and cutting machine illustrated in FIGURE 1.

A line dispensing and cutting machine is shown in FIGURES 1 and 2, and is generally referred to as 10. The machine 10 has a casing assembly 11 which includes a base member 12 having legs 13, a body member 14 with body flange 15 around its upper portion and a face surface 16 at its front portion. A cover member 17 is secured to the top of body member 14 by bolts 18 being threaded into body flange 15.

Face surface 16 acts as the control panel for the line dispensing and cutting machine 10. A first support block 21 is mounted on the face surface 16 and has on-off button 22 and jog button 23 mounted on it. A second support block 25 is mounted on the face surface 16 and has automatic manual button 26 and cutter button 27 mounted on it. A footage computer unit 30 is mounted on face surface 16 by a support plate 31. The support plate 31 provides a length dial indicator 32, a dial knob 33 and a start button 35. A manual cut-off button 34 is mounted to and supported by the face surface 16. The function of these controls will be explained in more detail below.

At the opposite end of the casing assembly 11 from the face surface 16 is mounted an inlet grommet 41. The inlet grommet 41 has an inlet grommet head 42 and an inlet grommet tube 43. A locking stud 44 is mounted on the body member 14 and acts in conjunction with a locking track 45 provided in inlet grommet head 42 to secure the inlet grommet 41 in place. The inlet grommet 41 has hole 41' extending its complete length. Thus various inlet grommets can be attached depending upon the size and shape of the material to be run through the machine 10. The hole 41' will be substantially the same shape and size of the line to be run. This prevents material having an enlarged deformity from passing through the machine 10 and damaging its operative elements, an example would be a knot in a cord.

Referring generally to FIGURES 1 and 2, the operative elements of the line dispensing and cutting machine will be described briefly. These parts are secured to the base member 12 by screws 46. The major operative elements of the machine 10 which are housed in the casing assembly 11 are the line drive mechanism 47, the shear cut assembly unit 48 and the heat cut assembly unit 49. The line to be dispensed and cut by this unit could be various forms of elongated material, such as wire, cable, plastic tubing, cord, et cetera. For illustrative purposes, the present discussion will be confined to a line material generally referred to as cord 50. The cord 50 will enter the inlet grommet 41 through hole 41' and pass to the line drive mechanism 47, to the shear cut assembly unit 48, through a transfer tube 51, through the heat cut assembly unit 49, and then passing out of the line dispensing and cutting machine 10 through outlet grommet 52. The outlet grommet 52 has an outlet grommet head 53 and an outlet grommet tube 54. The line drive mechanism 47 is provided with a tension wheel mounting block 61. A pivot member 63 is mounted to the upper portion of tension wheel mounting block 61 and pivotally supports a tension wheel support block 64. The tension wheel support block 64 supports a tension wheel 65 at one end. The tension wheel support block 64 is provided with a tension wheel arm 66 which is acted on by a tension spring 69. A tension adjustment screw 67 is mounted on a guide block 68 and acts on the tension spring 69 with an adjustable force. The tension wheel arm 66 forces the tension wheel 65 towards a drive wheel 62 with a direct force ratio to the force applied to the tension wheel arm 66 by the tension spring 69. Cord 50 passes between the tension wheel 65 and the drive wheel 62 and with the tension wheel 65 causing the cord 50 to be in contact with the drive wheel 62 so that it can be fed as the drive wheel 62 rotates as just explained. The drive wheel 62 will have its contact surface conditioned so that good gripping action will be had with the cord 50. The drive wheel 62 will move in a clockwise direction as viewed in FIGURE 2, passing the cord 50 through a passage hole 70, as viewed in FIGURES 4 and 5, in guide block 68 and then on through shear cut assembly unit 48, as explained above.

Motor 71 is secured to and supported by base member 12 and has drive wheel 62 mounted on its shaft 72. The shaft 72 passes through drive wheel 62 where it is connected with a cable 73. The cable 73 passes through the casing assembly 11 and connects to the footage computer unit 30. The r.p.m. of the motor 71 and the calibration of the footage computer unit 30 are so coordinated that the cable 73 conveys the rotation of the drive wheel 62 to the footage computer unit 30 until the length dial indicator 32 and the dial knob 33 have zeroed out which then causes the rotation of motor 71 to stop, as will be explained below. A cable cap 74 is mounted to the side of body member 14 by screws 75 as viewed in FIGURE 1. This provides for a gentler bend for cable 73 when the available space within casing assembly 11 is limited. A time delay unit 76 is mounted within casing assembly 11 and is part of the electrical circuit of the machine 10. The function of the time delay 76 is to cause a momentary delay between the time the signal is given to stop motor 71 and to initiate the cutting action of either shear cut assembly unit 48 or heat cut assembly unit 49, the purpose of which will be covered below.

To initially load the cord 50 in the inlet grommet 41 for dispensing the user will slide the cord 50 into the hole 41' until it reaches the drive wheel 62. The on-off button 22 will be activated to the "on" position. The user will punch jog button 23 causing the motor 71 to start thus rotating drive wheel 62. The operator will continue to push jog button 23 until the cord has passed through the machine 10 and out through outlet grommet 52. The button 26 should be set at the manual position and the operator can cut the cord 50 by pushing manual cut off button 34. The machine 10 is now ready for automatic operation and the desired length of the cord 50 should be set on the length dial indicator 32. The button 26 should be set at the automatic position. The type of material which cord 50 is made of will dictate whether the cut button is set for a heat cut or a shear cut. For the present example, we can assume that a shear cut is desired. The unit is ready for operation and when the start button 35 of footage computer unit 30 is pushed, the motor 71 will turn the drive wheel 62. When the desired amount of cord 50 has passed through the machine 10 the footage computer unit 30 will zero out and stop motor 71. Time delay unit 76 will prevent the operation of a solenoid 81, which controls the shear cut action, for a momentary period until the motor 71 comes to a complete stop, then the solenoid 81 will operate cutting the cord 50 to its desired length. The operator removes the cut cord 50 and pushes start button 35 again to initiate another cycle. In the present illustration, this is a manual operation; however, in some cases an automatic restart cycle may be desirable.

Figure 3:
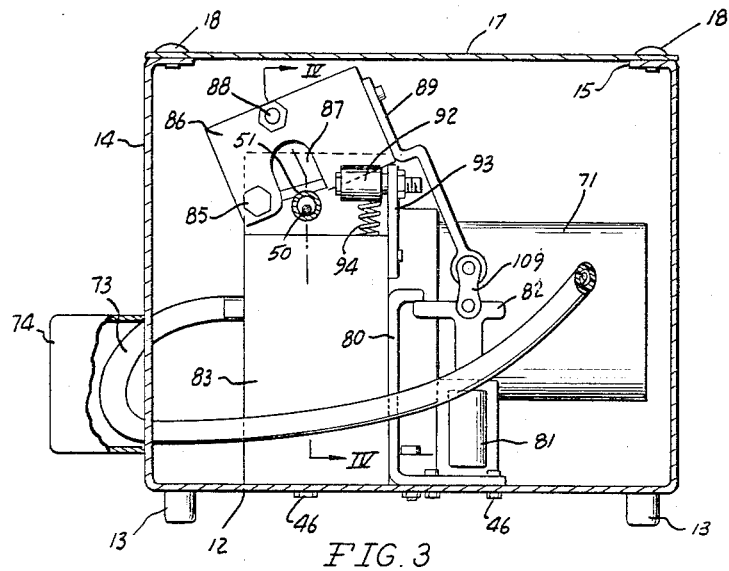
FIGURE 3 is an end elevational view showing the shear cut assembly unit in its extended position taken along line III—III of FIGURE 2 and looking in the direction of the arrows.

Now referring to FIGURES 3 and 6, the shear cutting action will be discussed in detail. The shear cut assembly unit 48 is in its initial position as illustrated in FIGURE 3. The cord 50 is passing through transfer tube 51. When the footage computer unit 30 zeros out the motor 71 will be stopped. After the momentary delay by time delay 76 the solenoid 81 will move a pull arm 82 from an extended position in contact with solenoid stop 80 shown in FIGURE 3 to a retracted position as shown in FIGURE 6. A support block 83 which supports guide block 68 also supports a blade block 84. A pivot member 85 pivotally secures a shear cutter block 86 to blade block 84. A shear cutter blade 87 is mounted to the shear cutter block 86 by a securing bolt 88 as viewer in FIGURE 5. A connector arm 89 is secured to the shear cutter block 86 and is connected to pull arm 82 by connector link 91. A pressure roller 92 is mounted on pressure roller support arm 93 which is in turn secured to the support block 83. The pressure roller 92 acts on shear cut block 86 holding the shear cutter blade 87 in contact with the blade block 84. A support spring 94 continually urges shear cut block 86 to remain in its extended position as illustrated in FIGURE 3. When solenoid 81 is activated, it moves shear cut block 86 to its retracted position is illustrated in FIGURE 6, thus cutting cord 50 by the shearing action between blade block 84 and shear cutter blade 87. The actuation of solenoid 81 is a momentary action before the circuit is broken again and the shear cutter block 86 is returned to its extended position of FIGURE 3.

Figure 4:
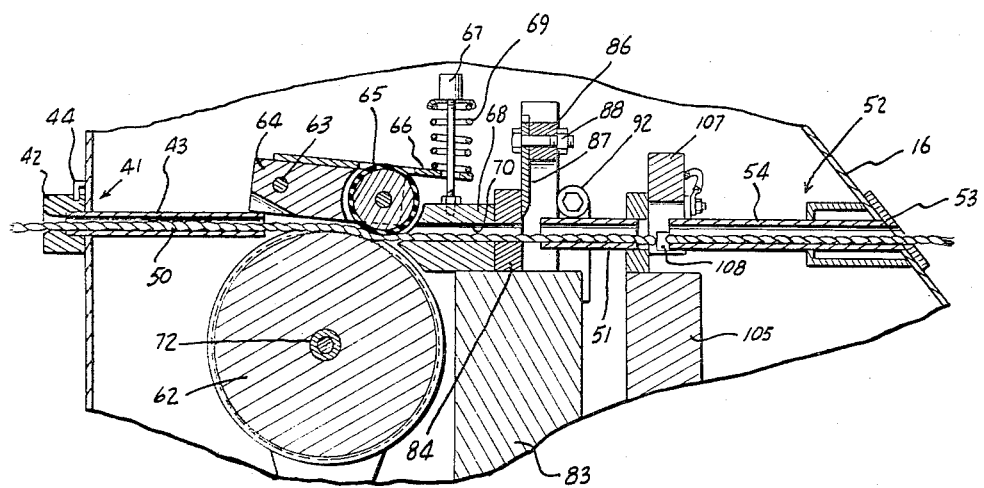
FIGURE 4 is a partial sectional view of the line dispensing and cutting machine taken along line IV—IV of FIGURE 3 just after the heat cut assembly unit has cut a length of line and looking in the direction of the arrows.

If some type of cord or line material is passing through the line dispensing and cutting machine 10, where heat cutting is required the cutter button 27 will be positioned to the heat cut position. In this operation set up when the footage computer unit 30 is zeroed the time delay 76 permits the motor 71 to come to a complete stop as explained above and then activates a solenoid 101 of heat cut assembly unit 49, shown in FIGURES 7 and 8. Before solenoid 101 is activated the heat cut assembly unit 49 is in an extended position as illustrated in FIGURE 7. After the solenoid 101 is activated the heat cut assembly unit 49 is in a retracted position as illustrated in FIGURE 8. A pull arm 102 contacts solenoid stop 100 in the extended position at one end and a shaft 103 of a check valve 104 at its opposite end. A support block 105 has a pivot member 106 connected to its upper portion. A heat cutter block 107 is pivotally connected to support block 105 by the pivot member 106. The cord 50 extends through the line dispensing and cutting machine 10 for automatic operation as explained above. When the footage computer unit 30 zeros out the time delay 76 passes the delayed signal to activate solenoid 101 when the motor 71 has stopped. When the solenoid 101 is activated the pull arm 102 is moved down. The check valve 104 causes the pull arm 102 to move down slowly from its extended position, as illustrated in FIGURE 7, to its retracted position, as illustrated in FIGURE 8, to permit the cutter wire 108 to move slowly through cord 50 while making its cut. The cutter wire 108 ends are connected by wires 109 and 110 which pass current through the cutter wire 108 heating it to a cutting temperature. The heat cutter block 107 is supported by a connector arm 111 which is connected to pull arm 102 by connector link 112. FIGURE 9 shows the position of the cutter wire 108 after it has cut cord 50 and the solenoid 101 is at the retracted position. The activation of solenoid 101 will terminate when the retracted position has been reached and the heat cutter block 107 will be returned to its extended position. FIGURE 4 shows the relative position of the system of the line dispensing and cutting machine 10 just after the cutter wire 108 has passed through the cord 50 cutting the leading edge to its desired length and the solenoid 101 is substantially at its retracted position shown in FIGURE 8.

Referring to FIGURE 10, a typical electrical diagram for the system will be explained. Power lines 118 and 119 are provided with connections 120 and 121. The current from power line 118 passes through connection 120 through a wire 122 to on-off button 22.

To illustrate the operation of the machine 10, we will assume that the cord 50 is just being loaded into the line dispensing and cutting machine 10. The line will be fed into the hole 41' in inlet grommet 41 until it arrives at drive wheel 62 as discussed above. As viewed in FIGURE 10, the on-off button 22 is in its off position. To completely load cord 50 in machine 10 the button 22 will be pushed so that wire 122 makes electrical contact with connection 123. This passes current through wire 124 up to connection 125. The current then passes in to footage computer unit 30 through post 126. The current continues from post 126 through wire 127 passing to switch 128. Switch 128 has connections 129 and 130. For the present illustration, the current passes to connection 129 on through wire 131 to post 132 where it leaves footage computer unit 30 via wire 133 and passes to automatic manual button 26. The button 26 has connection 134 for automatic operation and connection 135 for manual operation. In FIGURE 10 the button 26 is shown connected to automatic 134 but for the present illustration we will discuss this example when the button 26 is positioned in contact with connection 135. The current will pass through connection 135 through wire 136 down to manual cut off button 34. This button 34 will be activated when the user wishes to cut the cord 50 as will be explained below. Now returning to connections 125 the current also leaves connection 125 by wire 138 and runs to motor 71. The current passes through motor 71 and down through wire 139 to connection 140. The current leaves connection 140 through wire 141 and passes to jog button 23. When the user has fed the cord 50 through inlet grommet 41 in contact with drive wheel 62 he pushes jog button 23. This causes the current to pass through wire 141, through wire 142 and on to connection 143. The current passes from connection 143 through wire 144 to post 145 and re-enters footage computer unit 30 through wire 146 making contact with connection 147. A switch 148 operates with the connection 147 and a connection 149. The switch 148 interacts with switch 128 and they move back and forth between connections 129 and 130, and 147 and 149, respectively. In the present illustration, switch 128 is in contact with connection 129; therefore switch 148 is in connection with connection 147. This permits current to pass through switch 148 to wire 151 and on to post 152. The current now leaves the footage computer unit 50 through wire 153 and makes contact with connection 154. The current then passes from connection 154 through wire 155 and on through connection 121 to power line 119, completing the electrical circuit. Immediately upon the appearance of cord 50 coming out through outlet grommet head 53, the operator will cease to push job button 23. Cut button 34 will be pushed to cut the initial portion of cord 50 so that the automatic operation of the machine 10 can commence. By pushing manual cut off button 34, the current is already to the button through wire 136, the current will pass through wire 157 to connection 158 and on through wire 159 to cutter button 27. As stated earlier, the cutter button 27 should be positioned for either shear or heat. When the cutter button is positioned for shear, it makes contact with connection 160; when it is positioned for heat, it make contact with connection 161. For the present illustration, we will assume that the cutter button 27 is in contact with connection 160 as illustrated. This will pass current through wire 162 to the solenoid 81 and out through solenoid 81 through wire 163 to connection 154. The current then passes out to power line 119 through wire 155 and connection 121. When the current passes through solenoid 81 the shear cutter block 86 will be moved to its retracted position about pivot member 85 causing shear cut blade 87 to cut the cord 50 extending through the transfer tube 51. The line dispensing and cutting machine 10 is now ready for automatic operation. The on-off button 22 will be positioned to "on" position. The cutter button 27 will be connected to connection 160, the shear cutting operation. The automatic manual button 26 will be connected with connection 134, the automatic operation position. The length dial indicator 32 will be set to the desired length of cord wanted and the start button 35 will be activated causing switches 128 and 148 to contact connections 130 and 149, respectively. The current will enter from power line 118 through connection 120 through wire 122 and across button 22, passing through connection 123 and on through wire 124 up to connection 125. The current passes through wire 138 through motor 71 on through wire 139 up to connection 140 into footage computer unit 30 via post 165 through wire 166 to connection 149 on to switch 148 through wire 151 out through post 152 leaving the footage computer unit 30 through wire 153 making contact with connection 154 and passing through wire 155 and connection 121 to power line 119, thus completing the electrical circuit and causing the motor 71 to operate. As the motor 71 operates it turns the cable 73, represented by dash line 73, in FIGURE 10, until the dial knob 33 zeros out with the length dial indicator 32. When the length dial indicator 32 zeros out the switches 128 and 148 will move back into contact with connections 129 and 147 as illustrated in FIGURE 10. The current then passes from connection 125 to post 126 on through wire 127 through switch 128 into connection 129 through wire 131 to post 132. The current then leaves the footage computer unit 30 and passes through wire 133 on down to button 26 and into connection 134 and on through wire 167 into the time delay 76. The time delay has another wire 168 entering adjacent to wire 167. In order for the time delay 76 to operate in actuating solenoids 81 and 101, both wires 167 and 168 must be passing current to the time delay device. Power line 119 passes current through connection 121 through wire 155 to connection 154 on through wire 153 into footage computer unit 30 through post 152 then through wire 151 on through switch 148 through connection 147 through wire 146 and out of footage computer unit 30 via post 145. The current continues through wire 144 to connection 143 and then passes on to time delay 76 through wire 168. Therefore, current is received by time delay 76 by both 168 and 167 and after a momentary delay time delay 76 passes current out through line 169 where it makes contact with connection 158. The current then passes through wire 159 to button 27 on through connection 160 to solenoid 81 and back to the power line 119 as explained above.

The operations as explained would all function the same except that if the cutter button 27 was to be switched to heat in the place of the shear this would position cutter button 27 in contact with cannection 161. When this occurs the time delay 76 takes the same effect as stated above and when the current reaches the cutter button 27 through line 159 it will pass to connection 161 on through line 171 to connection 172. The current 172 will then pass through wire 109 through cutter wire 108 heating it for cutting purposes and then out through wire 110 to connection 154 and back to power line 119 through wire 155 and connection 121. When the current arrives at connection 172 it will also pass through wire 173 through solenoid 101 and out through wire 174 to connection 154 and back to power line 119 as just explained. When the solenoid 101 has current passing through it, it will rotate the heat cutter block 107 about pivot member 106 causing the cutter wire 108 to cut the cord which is passing through transfer tube 51.

The jog button will have no effect during the above mentioned conditions. In order for the jog button 23 to have any effect the on-off button 22 must be in contact with connection 123 and the footage computer unit 30 must have switches 128 and 148 in contact with connections 130 and 149, respectively. The cut button 34 will only have effect on the machine 10 when the automatic manual button 26 is in contact with manual connection 135 and the on-off button 22 is contacting connection 123.

The major purpose of the time delay 76 is to permit the motor 71 to halt before the shear cutter blade 87 cuts the cord 50. If the cord 50 was still moving when solenoid 81 was activated it would cause a pile-up of the cord 50 just cut in the blade block 84 when the shear cut blade 87 cuts the cord 50. When the cutter wire 108 is used to cut the cord 50, without the time delay 76 there would be an uneven cut to occur on the cord 50 and also might do damage to the cutter wire 108. The present illustration has shown a line dispensing and cutting machine having both a shear cut assembly unit 48 and a heat cut assembly unit 49. This was for illustrative purposes. In many commercial applications a machine would be equipped with only one cutter unit, either a shear cut unit or a heat cut unit, depending upon the type of material it was designed to dispense and cut.

While but one form of the invention has been shown and described, other forms within the spirit and scope of the invention will now be apparent to those skilled in the art. Therefore, the embodiment shown in the figures is to be considered as merely being set forth for illustrative purposes and is not intended to limit the scope of the invention herein described and shown.

Other modes of applying the principles of my invention may be employed instead of those explained, change being made as regards the apparatus herein disclosed, provided the means stated by any of the following claims or the equivalent of such stated means be employed.

I therefore particularly point out and distinctly claim as my invention:

1. A line dispensing and cutting machine comprising in combination
    (a) a casing assembly enclosing said machine,
    (b) said casing assembly having a first and second ends and a face surface,
    (c) a line inlet grommet secured to said first end,
    (d) a line drive mechanism mounted in said casing assembly aligned with and adjacent said inlet grommet,
    (e) a cut assembly unit mounted in said casing assembly aligned with and adjacent said line drive mechanism,
    (f) a line outlet grommet secured to said second end aligned with and adjacent said cut assembly unit,
    (g) a footage computer unit mounted on said casing assembly to automatically signal the stop of said drive mechanism when said drive mechanism has passed a set length of line through said machine,
    (h) a cable connecting said line drive mechanism to said footage computer unit indicating the length of line passed by said drive mechanism,
    (i) a time delay device to receive a cut signal from said footage computer unit when said stop signal is given to said drive mechanism,
    (j) said time delay device to convey said cut signal to said cut assembly unit momentarily after said signal is received, and
    (k) a jog button to manually start and stop said drive mechanism when loading said line in said machine.

2. A line dispensing and cutting machine as defined in claim 1 including
    (a) said line inlet grommet having an internal hole having substantially the size and shape of the line passing through said machine.

3. A line dispensing and cutting machine as defined in claim 1 including
    (a) a drive wheel and a tension wheel as part of said line drive mechanism having said line pass between them, and
    (b) an adjustable tension control means applying pressure between said tension wheel and said drive wheel.

4. A line dispensing and cutting machine as defined in claim 1 including
    (a) a shear cutter blade as part of said cut assembly unit,
    (b) a blade block as part of said cut asembly unit, and
    (c) said blade block acting with said shear cutter blade to cut said line when said cut assembly unit is activated.

5. A line dispensing and cutting machine as defined in claim 4 including
    (a) a pressure roller as part of said cut assembly unit to assist in holding said shear cutter blade in contact with said blade block when cut assembly unit is activated.

6. A line dispensing and cutting machine as defined in claim 1 including
   (a) a locking means mounted on said first end of said casing assembly, and
   (b) a receiving means on said line inlet means to act with said locking means to secure said line inlet means in position.

7. A line dispensing and cutting machine as defined in claim 1 including
   (a) a cutter wire as part of said cut assembly unit to cut said line when said cut assembly unit is activated.

8. A line member dispensing and cutting machine comprising, in combination
   (a) a casing assembly enclosing said machine,
   (b) a line inlet means secured to said machine and aligned with a first end opening of said casing assembly to guide a line member and substantially surround it,
   (c) a line member drive mechanism mounted in said casing assembly aligned with and adjacent said line inlet means to pass said line member through said machine,
   (d) a cut assembly unit mounted in said casing assembly aligned with and adjacent said line drive mechanism to act on said line member,
   (e) a line outlet means secured to said machine and aligned with a second end opening of said casing assembly and aligned with and adjacent said cut assembly unit to guide said line member and substantially surround it,
   (f) a control means mounted on said casing assembly to stop and start said drive mechanism,
   (g) said control means including a time delay means to activate said cut assembly unit to cut said line member momentarily after said control means signals said drive mechanism to stop,
   (h) an indicator means connecting said drive mechanism to said control means indicating the length of line member passed by said drive mechanism, and
   (i) said drive mechanism includes a tension wheel and a drive wheel in continuous contact with said line member.

9. A line member dispensing and cutting machine as defined in claim 8, wherein
   (a) said cut assembly unit includes a cutting means, and
   (b) an actuation means to move said cutting means and said line member relative to each other to cut said line member.

10. A line member dispensing and cutting machine as defined in claim 9, wherein
    (a) said cut assembly unit includes a heating means to heat said cutting means.

11. A line member dispensing and cutting machine as defined in claim 10, wherein
    (a) said control means including a metering means to automatically signal said drive mechanism to stop when said drive mechanism has passed a set length of line through said machine.

12. A line member dispensing and cutting machine as defined in claim 11, wherein
    (a) a jog button is provided with said machine to manually start and stop said drive mechanism when loading said line member in said machine.

13. A line dispensing and cutting machine as defined in claim 1, wherein
    (a) said cut assembly unit includes a cutting means, and
    (b) an actuation means to move said cutting means and said line relative to each other to cut said line.

14. A line dispensing and cutting machine as defined in claim 13, wherein
    (a) said cut assembly unit includes a heating means to heat said cutting means.

15. A line dispensing and cutting machine comprising, in combination
    (a) casing assembly enclosing said machine,
    (b) a line inlet means secured to a first end of said casing assembly to guide a line,
    (c) a line drive mechanism mounted in said casing assembly aligned with and adjacent said line inlet means to pass said line through said machine,
    (d) a cut assembly unit mounted in said casing assembly aligned with and adjacent said line drive mechanism to act on said line,
    (e) a line outlet means secured to a second end of said machine aligned with and adjacent said cut assembly unit to guide said line,
    (f) a control means mounted on said casing assembly to stop and start said drive mechanism,
    (g) a time delay device to activate said cut assembly unit to cut said line momentarily after said control means signals said drive mechanism to stop,
    (h) a shear cut assembly and a heat cut assembly as part of said cut assembly unit, and
    (i) a cutter button mounted on said case assembly to be switchably connected to activate said shear cut assembly or said heat cut assembly when said cut assembly unit is activated.

16. A line dispensing and cutting machine as defined in claim 15 including
    (a) a shear cutter blade as part of said shear cut assembly,
    (b) a blade block as part of said shear cut assembly, and
    (c) said blade block acting with said shear cutter blade to cut said line when said shear cut assembly is activated.

17. A line dispensing and cutting machine as defined in claim 15, including
    (a) a cutter wire as part of said heat cut assembly to cut said line when said heat cut assembly is activated.

18. A line dispensing and cutting machine as defined in claim 15, including
    (a) a metering device as part of said control means to automatically signal said drive mechanism to stop when said drive mechanism has passed a set length of line through said machine.

References Cited

UNITED STATES PATENTS

| | | | |
|---|---|---|---|
| 2,719,941 | 10/1955 | Presenz | 83—575 X |
| 2,796,930 | 6/1957 | Bennett | 83—436 X |
| 2,849,067 | 8/1958 | Krueger | 83—241 |
| 3,165,957 | 1/1965 | Kaplan | 83—436 X |
| 3,177,748 | 4/1965 | Rosenthal | 83—171 |
| 3,202,028 | 8/1965 | Rabelow et al. | 83—241 |
| 3,242,786 | 3/1966 | Giordano | 83—635 |
| 3,245,297 | 4/1966 | Small | 83—650 |
| 3,251,253 | 5/1966 | Eubanks | 83—208 |

JAMES M. MEISTER, *Primary Examiner.*